(12) United States Patent
Sasaki et al.

(10) Patent No.: US 6,355,905 B1
(45) Date of Patent: Mar. 12, 2002

(54) LASER PROCESSING APPARATUS

(75) Inventors: Haruki Sasaki; Kouji Kawamura, both of Chiba-ken (JP)

(73) Assignee: Miyachi Technos Corporation, Chiba-Ken (JP)

(*) Notice: Subject to any disclaimer, the term of this patent is extended or adjusted under 35 U.S.C. 154(b) by 0 days.

(21) Appl. No.: 09/422,464

(22) Filed: Oct. 21, 1999

(30) Foreign Application Priority Data

Oct. 29, 1998 (JP) .......................................... 10-324491

(51) Int. Cl.$^7$ ............................................... B23K 26/00
(52) U.S. Cl. .................................................. 219/121.62
(58) Field of Search ........................ 219/121.6, 121.61, 219/121.62, 121.83

(56) References Cited

U.S. PATENT DOCUMENTS

| | | | | |
|---|---|---|---|---|
| 4,378,492 A | * | 3/1983 | Nagashima et al. ........ | 250/215 |
| 4,564,012 A | * | 1/1986 | Shimada et al. ............... | 606/12 |
| 4,937,422 A | * | 6/1990 | Nagamine et al. ..... | 219/121.62 |
| 5,043,555 A | * | 8/1991 | Iehisa et al. ........... | 219/121.62 |
| 5,638,389 A | * | 6/1997 | Nagano et al. ................ | 372/31 |
| 5,703,365 A | * | 12/1997 | Ishihara et al. ........ | 250/339.13 |
| 5,731,884 A | * | 3/1998 | Inoue .......................... | 358/456 |
| 5,821,537 A | * | 10/1998 | Ishihara et al. ........ | 250/339.13 |
| 5,986,252 A | * | 11/1999 | Kawamura .................. | 250/205 |

\* cited by examiner

*Primary Examiner*—Samuel M. Heinrich
(74) *Attorney, Agent, or Firm*—Wenderoth, Lind & Ponack, L.L.P.

(57) ABSTRACT

In a power monitor mode, during the laser oscillation output there are fetched laser output measured values, lamp voltage measured values and lamp current measured values (step $J_1$), and energy of each pulse is figured out on the basis of time integral value of the laser output measured values (step $J_2$). Then, at a certain time Ta interval, an energy average value and a laser output average value are figured out for display based on the cumulative value of the energy of each pulse, and a lamp power average value $Q_M$ and a lamp power input ratio $K_M$ are found by calculation from the cumulative value of the lamp power $(S_V \cdot S_I)$ of each pulse (step $J_5$). In OFF display mode the lamp power input ratio $K_M$ appears. Under the laser output feedback control, the lamp power input ratio $K_M$ gradually goes up according as the deterioration with time increases within a laser oscillation unit.

17 Claims, 10 Drawing Sheets

[ SCHEDULE SCREEN ]

```
-SCH. # 03 [FORM: FIX ]~20.0J  WATER 28°C
 ~ : OFF  PEAK= 10.00 kW    REPEAT= 500 pps
 ↑ SLOPE 01.0 ms              SHOT = 9999
   FLASH1 01.0 ms 100.0 % HIGH 999.9 J
   FRASH2 01.5 ms 025.0 % LOW  000.0 J
   FLASH3 03.0 ms 050.0 %
 ↓ SLOPE 01.0 ms
 HV: OFF  MAIN SHUTTER: OFF  POSITION: OFF
```

FIG.6B  [ LASER OUTPUT SETTING WAVEFORM ]

[ STATUS SCREEN ]

```
-STATUS   [PANEL CONTROL]      WATER  28 °C
 BEAM-1:OFF   RESET  SELECT      PRESET
 BEAM-2:OFF  →SHOT  123456789   123456789
 BEAM-3:OFF  →GOOD  123456789   123456789
 BEAM-4:OFF          CONTROL:[LASER POWER]
 BEAM-5:OFF          POSITION BLINK:OFF
 BEAM-6:OFF          FIBER:[SI]  φ0.0mm
 HV:OFF  MAIN SHUTTER:OFF  POSITION:OFF
```

[ POWER MONITOR SCREEN ]

```
-POWER MONITOR SCH.#00 MW:[ON]   WATER 28°C
ENERGY    12.5J
AVERAGE  312.5W
SHOT COUNT 123456789
GOOD COUNT 123456789
 HV:OFF  MAIN SHUTTER:OFF  POSITION:OFF
```

FIG.10

[ POWER MONITOR SCREEN ]

```
-POWER MONITOR SCH.# [03]  MW : [OFF]  WATER 28°C
ENERGY    12.5J    HIGH [999.9] J
                   LOW  [000.0] J
AVERAGE  312.5W    LAMP INPUT PWR 084%
SHOT COUNT 123456789   REFERENCE SET [095] %
GOOD COUNT 123456789
  HV:OFF   MAIN SHUTTER:OFF   POSITION:OFF
```

FIG.12

[ ALARM MESSAGE SCREEN ]

```
                              WATER 28°C
         LAMP INPUT POWER LIMIT !!

CHECK THE LAMPS !!

(LAMP INPUT POWER 097%)

HV:OFF   MAIN SHUTTER:OFF   POSITION:OFF
```

LASER PROCESSING APPARATUS

BACKGROUND OF THE INVENTION

1. Field of the Invention

The present invention relates to a laser processing apparatus using a light source as laser excitation means.

2. Description of the Related Arts

A laser oscillation unit of the laser processing apparatus using solid-state laser comprises a solid-state laser medium, e.g., a YAG rod; a light source for excitation, e.g., an excitation lamp; and a pair of optical resonator mirrors disposed on the optic axis of the solid-state laser medium.

When the excitation lamp is lit as a result of reception of electric power from the laser power supply unit, its optical energy excites the YAG rod, allowing beams of light emerging from both end surfaces of the YAG rod onto its optic axis to be repeatedly reflected for amplification between the pair of the optical resonator mirrors, after which the beams of light exit the output mirror in the form of laser beams. After having left the output mirror, the laser beams are transmitted via a predetermined transmission optical system to an output unit at the site to be processed and are then projected from the output unit onto the workpiece.

In such a laser oscillation unit, in accordance with the number of times that the laser oscillation increases, the laser oscillation efficiency may lower due to the degradation of the excitation lamp or to the dirt or the like on the YAG rod or the optical resonator mirrors.

In order to keep the laser output at its set value in the face of degradation over time in the laser oscillation unit, the laser power supply unit is typically provided with a laser output feedback function. Such a feedback function provides a control of the electric powers, currents or voltages fed to the excitation lamp by use of optical sensors or the like for measuring the laser output (optical intensity) of the laser beams, to thereby allow the laser output measured value to coincide with the laser output set value.

The above laser output feedback function ensures compensation for deterioration over time in the laser oscillation unit, thereby retaining the laser output of the laser beam at its set value.

Nevertheless, with deterioration increasing with time, a difference (error) will become greater between the laser output of the laser beams oscillatorily emitted from the laser oscillation unit and the electric power input (fed) from the laser power supply unit to the excitation lamp. This means that a greater electric power is required for compensation of deterioration over time in the laser oscillation unit.

While the lamp input power becomes greater as deterioration increases with time in the laser oscillation unit, the excitation lamp itself has a limit value for the input power. If this limit value is exceeded, the excitation lamp will break (usually, the lamp glass tube will break), thereby stopping laser oscillation.

At that time, in most cases, the excitation lamp is replaced with a new one. Upon the lamp replacement, scattered fragments of the broken glass tube of the existing excitation lamp must be cleaned up, which was very cumbersome. In addition, an unexpected, abrupt interruption of the laser processing caused by breakage of the excitation lamp often reduces productivity.

SUMMARY OF THE INVENTION

The present invention was conceived in view of the above problems involved in the prior art. It is therefore the object of the present invention to provide a laser processing apparatus having a function which ensures a precise prediction or notice of the time to replace the light source for excitation, achieving improved maintenancability and productivity.

In order to attain the above object, according to an aspect of the present invention there is provided a laser processing apparatus comprising a laser oscillation unit having a light source for excitation which issues optical energies to excite a solid-state laser medium, to thereby allow an oscillatory emission of laser beams therefrom; a laser power supply unit for supplying electric powers to the light source for excitation; input power measurement means for measuring electric powers fed to the light source for excitation; input power limit value setting means for setting limit values of input powers to the light source for excitation; power input ratio computing means which accept input power measured values from the input power measurement means to figure out a ratio of the input power measured value to the input power limit value; and power input ratio display means for providing a display output of the ratio figured out by the power input ratio computing means.

Preferably the laser processing apparatus of the present invention further comprises power input ratio upper limit setting means for setting a desired upper limit of the ratio, and alarm signal output means for issuing a predetermined alarm signal when the ratio figured out by the power input ratio computing means reaches or exceeds the upper limit value.

The laser processing apparatus of the present invention may further comprise alarm display means for providing a display output of predetermined alarm information in response to the alarm signal.

The laser processing apparatus of the present invention may further comprise laser oscillation stop means for ceasing laser oscillation in response to the alarm signal.

In such a case, the laser processing apparatus of the present invention preferably further comprises laser output setting means for setting a desired laser output of the laser beam; laser output measurement means for measuring laser output of the laser beam; laser output comparison means for comparing laser output measured values acquired by the laser output measurement means with laser output set values from the laser output setting means, to find a comparison error; and laser output control means for providing a control of electric powers, currents or voltages fed to the light source for excitation in response to the comparison error so as to ensure that the laser output measured value coincides with the laser output set value.

According to the laser processing apparatuses of the present invention as described hereinabove, the ratio (power input ratio) of the input power measured value to the input power limit value is figured out for the excitation light source within the laser oscillation unit and the thus obtained ratio is output for display, whereby it is possible to provide a precise prediction or notice of the time to replace the excitation light source, remarkably improving the maintenance of excitation light source and the productivity of the laser processing.

BRIEF DESCRIPTION OF THE DRAWINGS

The above and other aspects, objects, features and advantages of the present invention will become more apparent from the following detailed description with reference to the accompanying drawings, in which:

FIG. 6B is a graphic representation of a laser output setting waveform;

FIG. 10 is a diagram showing an example of display of a "power monitor screen" in OFF display mode of the embodiment;

FIG. 12 is a diagram showing an example of display of an "alarm message screen" of the embodiment.

DESCRIPTION OF THE PREFERRED EMBODIMENT

The present invention will now be described with reference to the accompanying drawings which illustrate a presently preferred embodiment thereof in a non-limitative manner.

Figure 1:
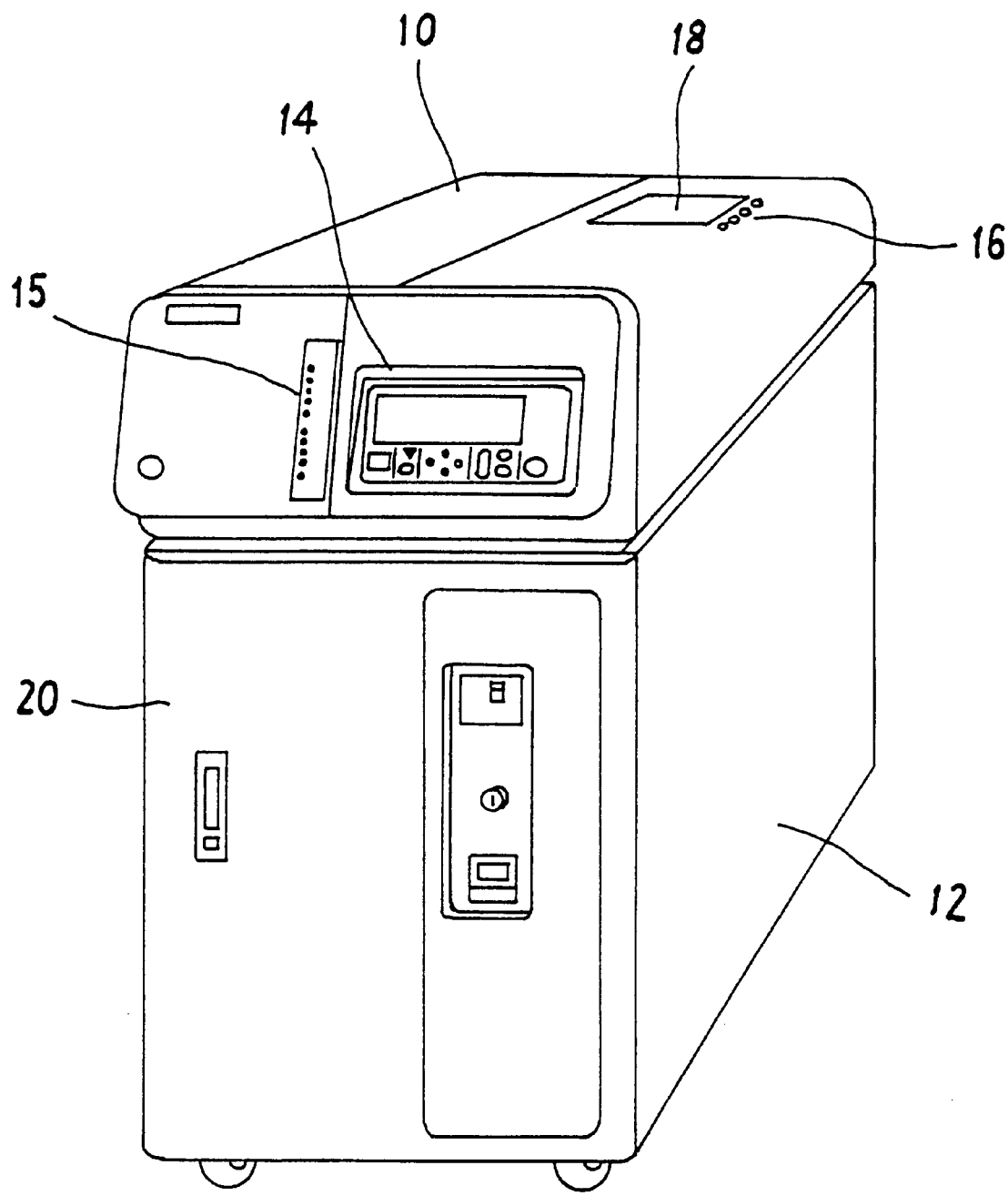
FIG. 1 is a perspective view showing the external appearance of a laser processing apparatus in accordance with an embodiment of the present invention.
Figure 2:
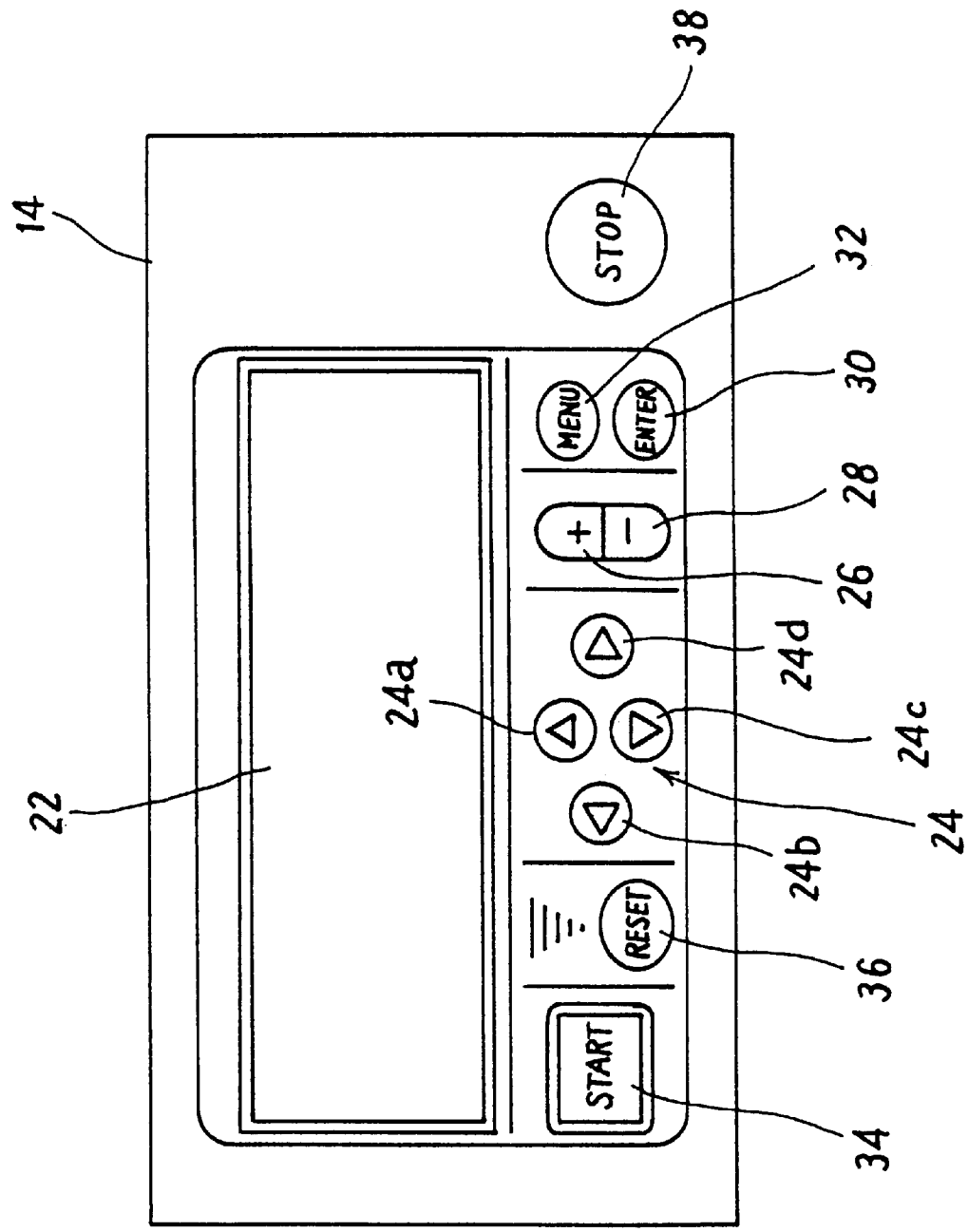
FIG. 2 is an enlarged partial plan view showing the external appearance of a console panel of the laser processing apparatus in accordance with the embodiment in an enlarged manner.

Referring first to FIGS. 1 and 2 there are depicted external configurations of a laser processing apparatus in accordance with an embodiment of the present invention. FIG. 1 is a perspective view of the entire apparatus and FIG. 2 is an enlarged partial plan view of a console panel of the apparatus.

As can be seen in FIG. 1 the laser processing apparatus comprises an upper housing 10 and a lower housing 12 which are integrally coupled together. The upper housing 10 accommodates therein a laser oscillation unit, a control, a laser branching unit for multi-position processing, etc. The front surface of the upper housing 10 is provided for example with the console panel designated at 14 including a display and various key switches for the setting entry/display output of various set values, measured values, etc, and with a group of LEDs 15 for the lighting display of the condition of current supply, the condition of high-voltage supply, the condition of completion of charging. The top surface of the upper housing 10 is provided with a plurality of holes (openings) 16 through which a plurality of optical fibers not shown pass for the multi-position processing, and with an openable lid 18 for connecting the optical fibers.

The lower housing 12 accommodates therein a power part, an external connection terminal and a breaker which constitute a power supply unit; a tank, a pump, a heat exchanger, an ion exchange resin, a filter and an external piping connection terminal which constitute a cooling unit, etc. The lower housing 12 has a front panel 20 in the form of a door.

Turning to FIG. 2, the console panel 14 has in the middle thereof a flat panel display, e.g., a liquid crystal display 22, below which are arranged various function keys which include in this embodiment cursor keys 24a to 24d, a plus (+) key 26, a minus (-) key 28, an enter key 30, a menu key 32, a start button 34, a reset button 36 and an emergency stop button 38.

The cursor keys 24a to 24d serve to move a cursor on the screen in the vertical and horizontal directions. When the key 24a to 24d are pressed, the cursor is moved in the directions indicated by the arrows of those keys.

The plus (+) key 26 and the minus (-) key 28 are data entry keys which, as will be described later, are used for the entry of numerical values (decimal numbers) into the numerical items, the selection of "ON" or "OFF" for the "ON/OFF" item, the selection of "FIX" or "FREE" for the "FIX/FREE" item, etc.

The enter key 30 is a key for establishing displayed data at the position of the cursor as definite set data. The menu key 32 is a key for selecting the screen mode of the apparatus.

The start button 34 is a key for activating the apparatus to issue (emit) a pulsed laser beam. The reset button 36 is used to cancel a "trouble screen" (not shown), that appears on the display 22 at the time of occurrence of any trouble. The stop button 38 is operated upon the emergency so that, when it is pressed, a high-voltage is shut off with the cooling unit coming to a stop.

Figure 3:
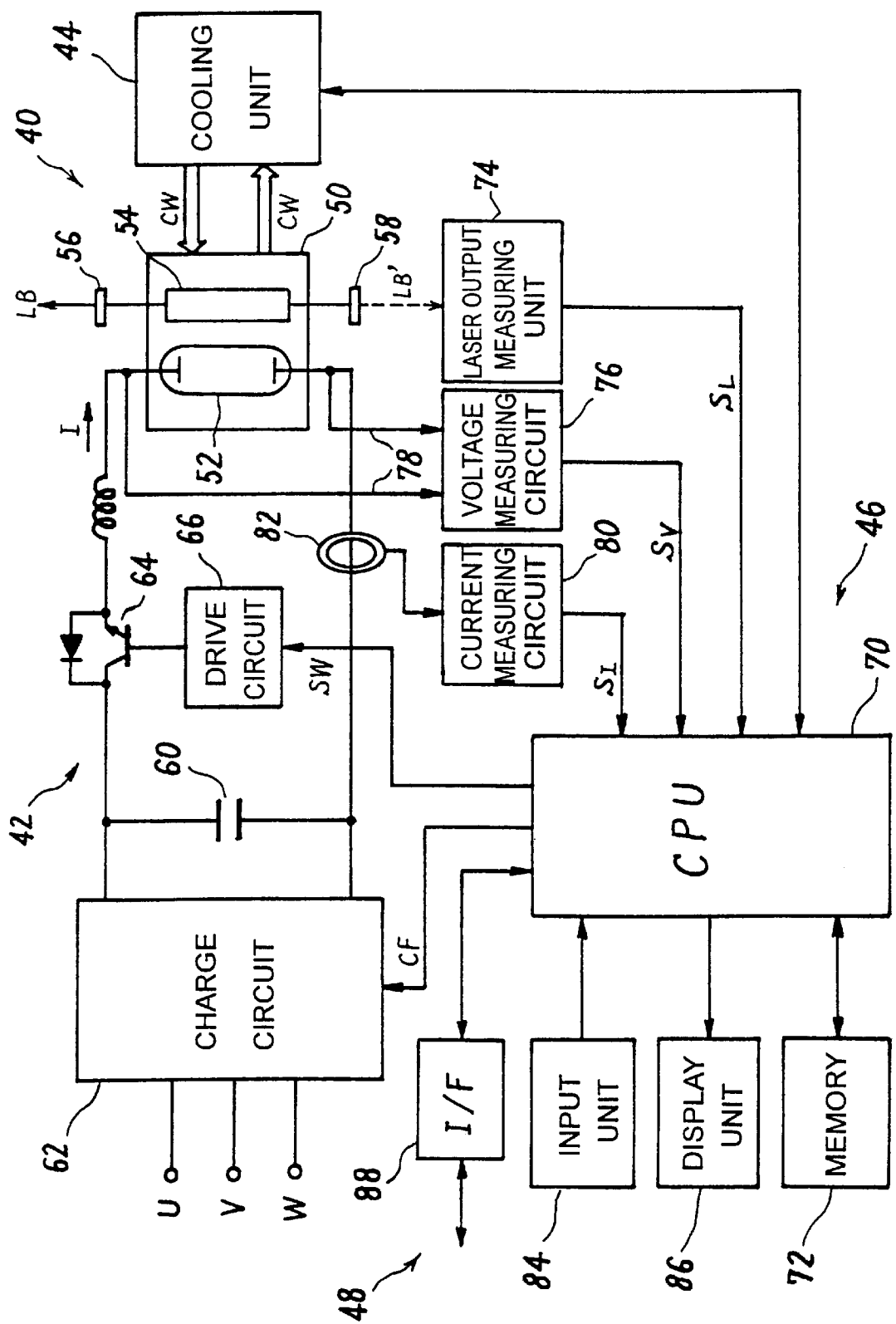
FIG. 3 is a block diagram showing a configuration of the laser processing apparatus in accordance with the embodiment.

FIG. 3 is a block diagram showing a configuration of the laser processing apparatus. The laser processing apparatus of this embodiment comprises the laser oscillation unit, the laser power supply unit, the laser cooling unit and the control, which are generally designated at 40, 42, 44 and 46, respectively, as well as an I/O interface unit also generally designated at 48.

The laser oscillation unit 40 includes a light source for excitation, e.g., an excitation lamp 52 and a laser medium, e.g., a YAG rod 54 which are arranged within a chamber 50, as well as a pair of optical resonator mirrors 56 and 58 which are disposed on the optic axis of the YAG rod 54 outside the chamber 50.

When the excitation lamp 52 is lit, its optical energy excites the YAG rod 54 so that beams of light emerge from both ends of the YAG rod 54 along its optic axis and are iteratively reflected for amplification between the optical resonator mirrors 56 and 58, after which they exit an output mirror 56 in the form of pulsed laser beams LB. After having left the output mirror 56, the pulsed laser beams LB are transmitted to the laser branching unit (not shown), in which they are split into a plurality of branch pulsed laser beams. The branch pulsed laser beams are then transmitted through corresponding optical fibers (not shown) to corresponding output units (not shown) at processing sites, which radiate the branch pulsed laser beams toward a workpiece.

The laser power supply unit 42 includes a capacitor 60 for storing therein electric powers for laser oscillation to be fed to the laser oscillation unit 40, a charging circuit 62 for converting commercial alternating currents at, e.g., the three-phase AC power supply voltage (U, V, W) into direct currents to charge the capacitor 60 up to a predetermined DC voltage, a transistor 64 acting as a switching element connected between the capacitor 60 and the excitation lamp 52 of the laser oscillation unit 40, and a drive circuit 66 for switchingly driving the transistor 64 at a high frequency (e.g., 10 kHz).

The laser cooling unit 44 serves to deprive the laser oscillation unit 40 of heat generated by the excitation lamp 52 and the YAG rod 54 in the laser oscillation unit 40, the laser cooling unit 44 being designed to feed a coolant, e.g., cooling water CW regulated to have a predetermined temperature into the laser oscillation unit 40.

The control 46 includes a CPU (microprocessor) 70 for controlling operations of the entire apparatus and of each part, a memory 72 for holding therein various programs and various set values or computing data to allow the CPU 70 to execute predetermined processing, and a plurality of measurements means 74, 76, 78, 80 and 82 for measuring laser outputs of the pulsed laser beams LB or electrical parameters within the laser power supply unit 42 corresponding thereto.

Of those measurement means, a laser output measuring unit 74 has a photosensor for receiving laser beams LB' which can leak backward of the optical resonator mirror 58, and a measurement circuit for determining the laser outputs of the pulsed laser beams LB on the basis of electric signals issued from the photosensor, with thus obtained laser output measured values $S_L$ being fed to the CPU 70.

A voltage measuring circuit 76 is electrically connected through voltage detecting lines 78 to both terminals of the excitation lamp 52. The voltage measuring circuit 76 measures, in e.g., effective values, voltages (e.g., lamp voltages) applied by the power supply unit 42 to the excitation lamp 52 and feeds thus obtained lamp voltage measured values $S_V$ to the CPU 70. A current measuring circuit 80 receives current detection signals from a current sensor, e.g., a Hall CT 82 attached to a lamp current supply circuit of the power supply unit 42, to measure, in effective values, currents (lamp currents) supplied the excitation lamp 52. Thus obtained lamp current measured values $S_I$ are fed up to the CPU 70.

For the power supply unit 42, the CPU 70 imparts charge control signals CF for charging the capacitor 60 up to set voltages to the charging circuit 62 and imparts switching control signals SW for waveform control to the drive circuit 66.

In the waveform control of this embodiment, the CPU 70 finds comparison errors. For example, the CPU 70 compares a previously set reference waveform for waveform control with: the laser output measured values $S_L$ from the laser output measuring unit 74; the lamp voltage measured values $S_V$ from the voltage measuring circuit 76; the lamp current measured values $S_I$ from the current measuring circuit 80; or lamp power measured values $S_P$ ($S_V \cdot S_I$) derived from the lamp voltage measured values $S_V$ and the lamp current measured value $S_I$. The CPU 70 generates switching control signals SW, which for example may be pulse width control signals, so as to nullify the comparison errors.

Such a feedback control system allows the laser output of the pulsed laser beams LB oscillation output from the laser oscillation circuit 40, or electrical parameters (lamp currents, lamp powers, lamp voltages) of the laser power supply unit 42 that correspond thereto, to follow the reference waveforms for waveform control.

The I/O interface unit 48 includes an input unit 84, a display unit 86 and a communication interface circuit (I/F) 88. The input unit 84 is provided in the form of the key switches of the console panel 14 and the display unit 86 consists of the group of LEDs and the display 22 which are arranged on the front of the apparatus. The interface circuit 88 is used for data communication with external apparatuses or units.

It is to be noted that the console panel 14 may be provided in the form of a unit (program unit) separable from the apparatus body. In such a case, the program unit can be provided with the CPU 70, the memory 72, the input unit 84 and the display unit 86, and it is electrically connected to the apparatus body by way of communication cables.

Figure 4:
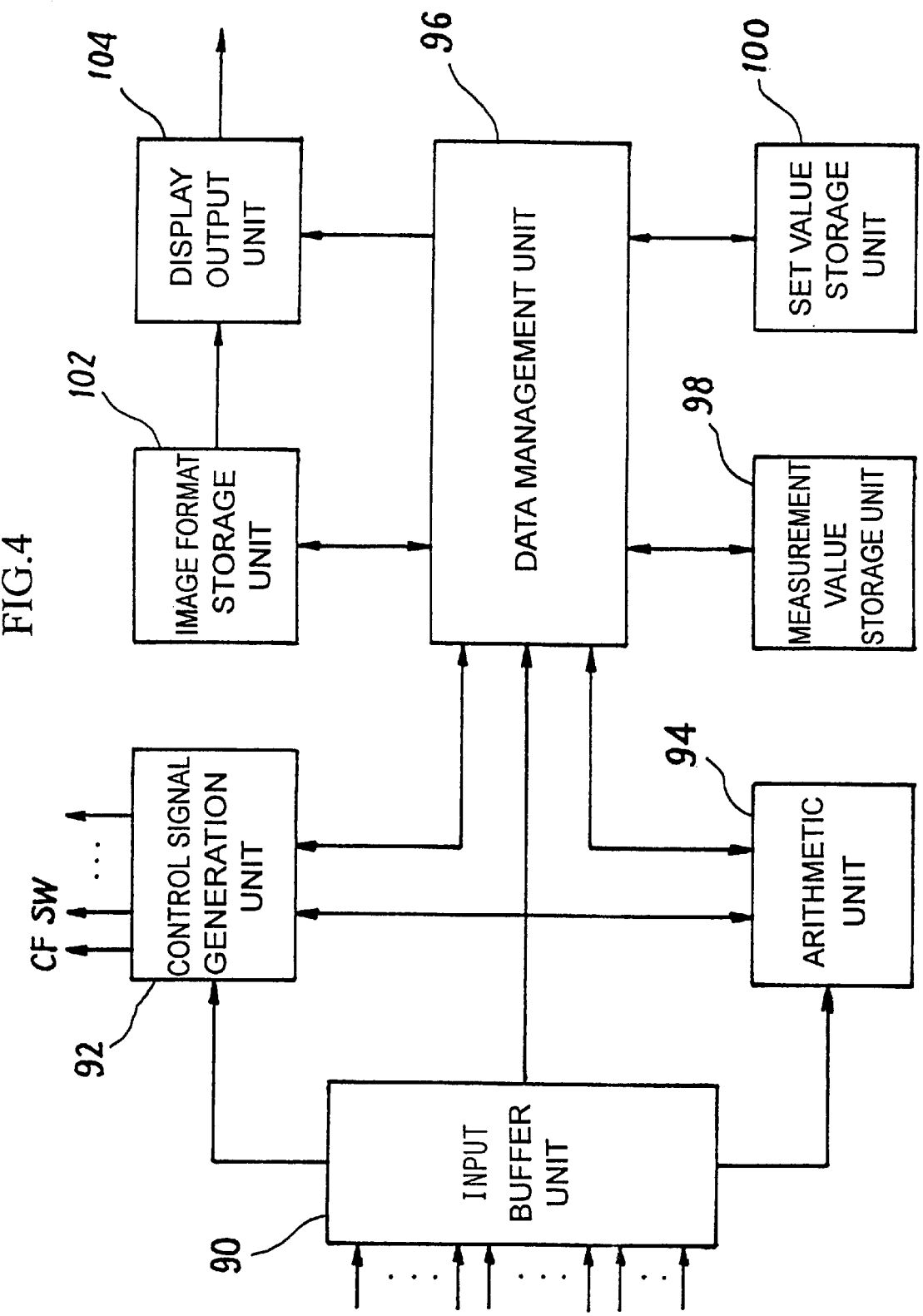
FIG. 4 is a block diagram showing a configuration of functional means implemented by a CPU and a memory of the laser beam processing apparatus in accordance with the embodiment.

Referring then to FIG. 4, there is depicted in a block diagram, the configuration of functional means implemented by the CPU 70 and the memory 72 in this embodiment. As shown, the CPU 70 and the memory 72 provide an input buffer unit 90, a control signal generation unit 92, an arithmetic unit 94, a data management unit 96, a measurement value storage unit 98, a set value storage unit 100, an image format storage unit 102 and a display output unit 104.

The input buffer unit 90 temporarily holds data input to the CPU 70 such as set data from the input unit 84, external data from the communication interface circuit 88 and measured value data from the cooling unit 44 or the measuring circuits 74, 76, 80.

The arithmetic unit 94 executes all computing processings imposed on the CPU 70. The control signal generation unit 92 generates all control signals issued from the CPU 70 to the exteriors. The data management unit 96 manages all data savings and moves within the CPU 70 and the memory 72.

The measurement value storage unit 98 holds measured value data entered into the CPU 70, and the set value storage unit 100 holds set value data entered into the CPU 70 or set value data obtained by computing within the CPU 70.

The image format storage unit 102 stores therein image data representative of images of formatted portions whose display contents are fixed among various screens appearing on the display 22. The display output unit 104 superimposes images of set values or other variables from the data management unit 96 upon formatted images imparted by the image format storage unit 102 in order to build combined screens, with image data of those combined screens being output to the display unit 86.

Figure 5:
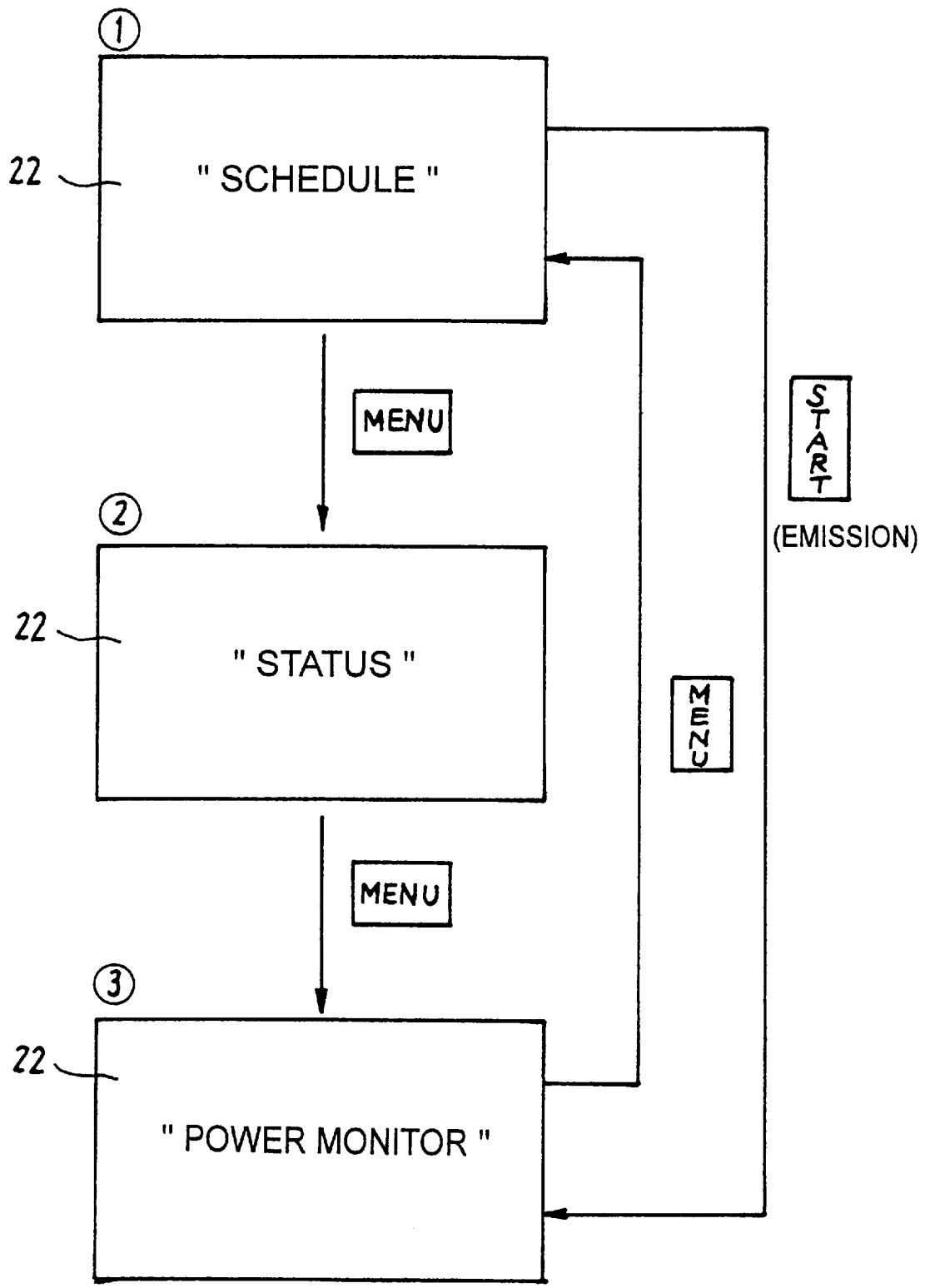
FIG. 5 is a diagram showing major screens displayed in the apparatus of the embodiment and mutual relationships of switching over these screens.

FIG. 5 illustrates major screens appearing on the display 22 in this embodiment as well as relationships of mutual switchover among the screens.

This embodiment has three major screens, i.e., ①"schedule screen" for allowing the user to enter desired set values into various set items, ②"status screen" for providing a display of major intra-apparatus status information, and ③"power monitor screen" for providing a display of the laser output measured value of a most recently issued pulsed laser beam LB. Among them, ③"power monitor screen" is a screen of particular importance. The three mode screens ①, ② and ③ are mutually switchable as shown in FIG. 5 by the operation of the menu key 32.

Figure 6A:
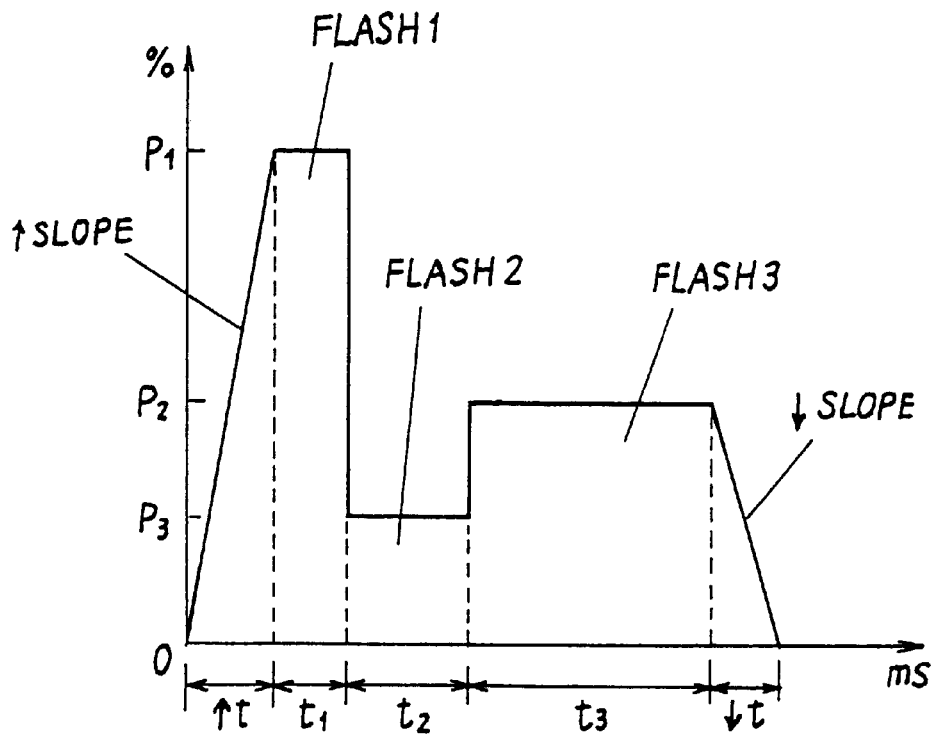
FIG. 6A is a diagram showing an example of display of a "schedule screen" of the embodiment.
Figure 7:
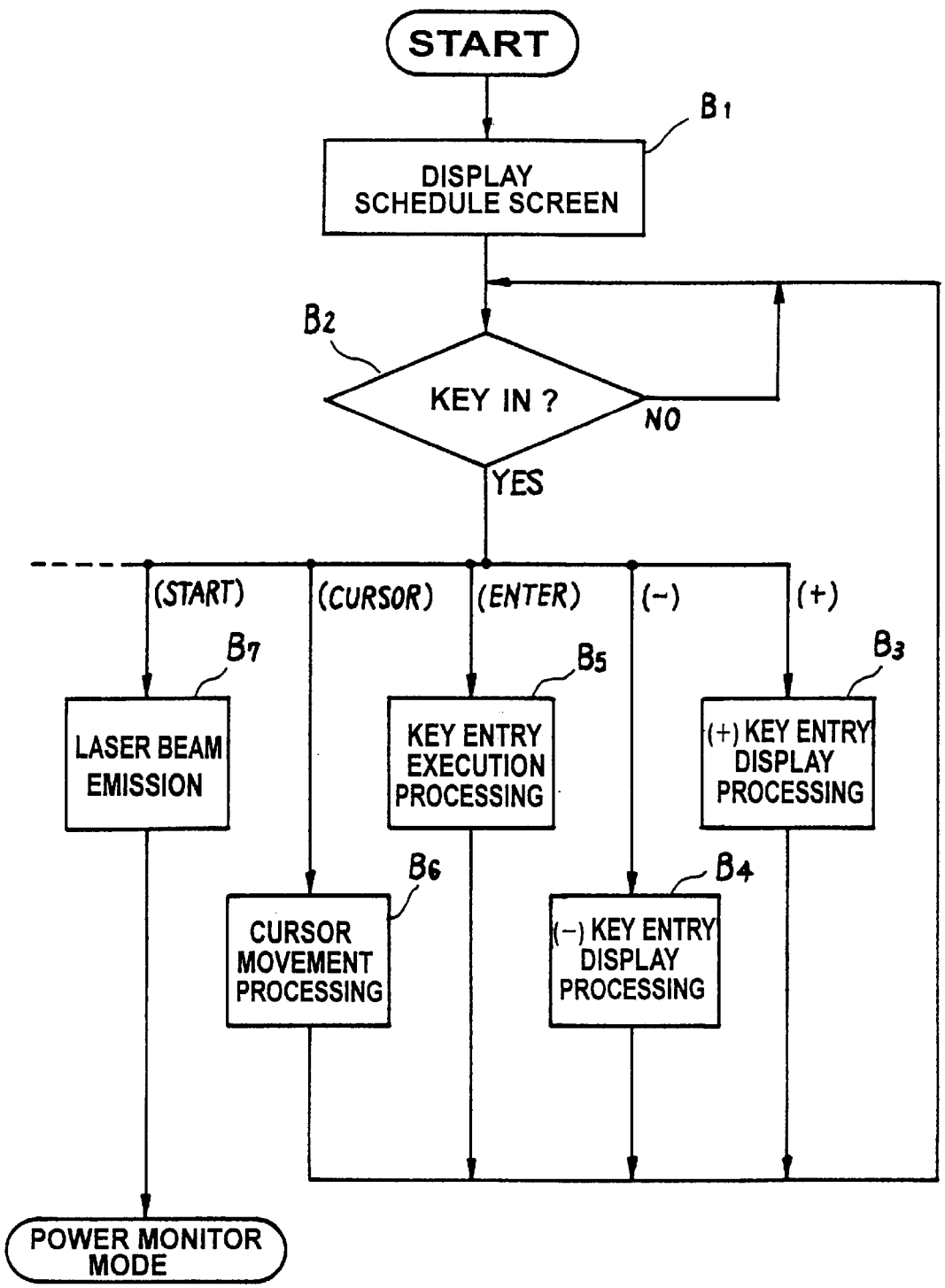
FIG. 7 is a diagram showing main processing procedures executed by the CPU in a schedule mode of the embodiment.

FIG. 6A illustrates by way of example the contents of display of the "schedule screen". FIG. 7 illustrates main processing procedures executed by the CPU 70 in the "schedule screen" mode.

For ease of illustration in FIG. 6A, items capable of setting entry are enclosed by broken lines on the screen. It will be appreciated that any actual screens do not bear such broken lines. Numerical values indicated by hollow or bold letters are various measured values, which could not be set or altered by key entries. Similar illustrations are given to FIGS. 8, 9 and 10 which will be described later as well.

In the schedule mode there first appears on the display 22 a "schedule screen" which was displayed immediately before the termination of the most recent schedule mode (step $B_1$). On the thus displayed "schedule screen", it is possible for the user to perform the entry of desired set values and instructions of operations to the apparatus through the key entries by means of key buttons 24 to 38 on the console panel 14 (step $B_2$).

More specifically, the cursor is moved to a data entry position for each item (step $B_6$), and the plus (+) key 26 or the minus (−) key is operated until desired numerical values are reached (steps $B_3$ and $B_4$), after which the enter key 30 is pressed.

In response to the key entry of the enter key 30, the CPU 70 executes key entry execution processing in compliance with the kind of entry display data at that data entry position indicated by the cursor (step $B_5$).

In the example shown, to set and enter a reference waveform for waveform control, desired numerical data are set and entered into items consisting of a laser output reference value PEAK, and waveform elements ↑ SLOPE, FLASH1, FLASH2, FLASH3, and ↓ SLOPE.

Any laser output value can be set and entered in kW into the laser output reference value PEAK of these items. Usually, however, selection may be made of a value (e.g., 10, 20, 50, 100, 1000, etc.) which is suitable for the reference of the calculation of ratio in the vicinity of the laser output maximum value desired to be imparted to the pulsed laser beam LB to be shot at that schedule number.

Time ⊔ t, ↓ t is only set and entered for an upslope ↑ SLOPE and a downslope ↓ SLOPE. For the flash periods FLASH1, FLASH2 and FLASH3 there are set and entered a laser output value for each period in the form of a value p1, p2, p3 of ratio relative to the laser output reference value PEAK as well as time t1, t2, t3 of each period.

Numerical values are entered into each item for setting the reference waveform. The user moves the cursor to a data entry position for each item and acts on the plus (+) key 26 or the minus (−) key 28 until desired numerical values are reached. Then the user presses the enter key 30. In response to such key operations, the CPU 70 executes the numerical value entry display processing (steps $B_3$ and $B_4$) and setting processing (step $B_5$), after which it stores the entered set value data at predetermined storage addresses within the set value storage unit 100.

In the example of setting shown in FIG. 6A, the laser output reference value PEAK is set to 10.0 (kW), with the laser output ratios p1, p2 and p3 of the flash periods FLASH1, FLASH2 and FLASH3 being set respectively to 100.0 (%), 25.0 (%) and 50.0 (%). In terms of kW values the laser output values (kW) of the flash periods FLASH1, FLASH2 and FLASH3 are set respectively to 10.0 (kW), 2.5 (kW) and 5.0 (kW).

In the numerical value setting processing for waveform element items as described above, the CPU 70 creates a reference waveform for waveform control as well as a reference waveform graph for display. The CPU 70 then stores data of the thus created reference waveform graph at predetermined storage areas within the set value storage unit 100. The CPU 70 further multiplies (converts) a laser output ratio (r) of each part of the reference waveform graph by the laser output reference value PEAK to find a proper reference waveform for waveform control, the resultant reference waveform data being also stored at predetermined storage areas within the set value storage unit 100.

The "schedule" screen, in addition to enabling entry of the reference waveform as described above, enables entry of a repetition frequency REPEAT and a shot count SHOT of the pulsed laser beam LB through similar user operations (key entry operations) and similar apparatus operations to the above. As used herein, the shot count is the total number of a series of pulsed laser beams LB shot in response to a single start signal.

Figures 8, 9:
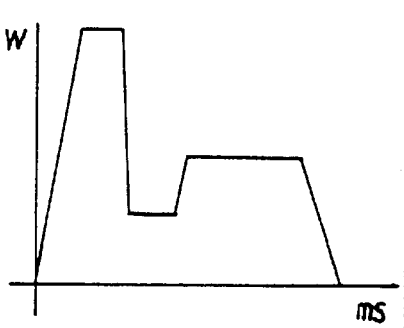
FIG. 8 is a diagram showing an example of display of a "status screen" of the embodiment.
FIG. 9 is a diagram showing an example of display of a "power monitor screen" in ON display mode of the embodiment.

Referring next to FIG. 8, the contents of display of "status screen" are shown by way of example. On the "status screen," there appear the ON/OFF status of shutters for a plurality of, e.g., six split pulsed laser beams (BEAM-1 to BEAM-6) for multi-position processing, feedback parameters being currently selected in the laser output waveform control (LASER OUTPUT/LAMP POWER/LAMP CURRENT) or other major status information.

Figure 11:
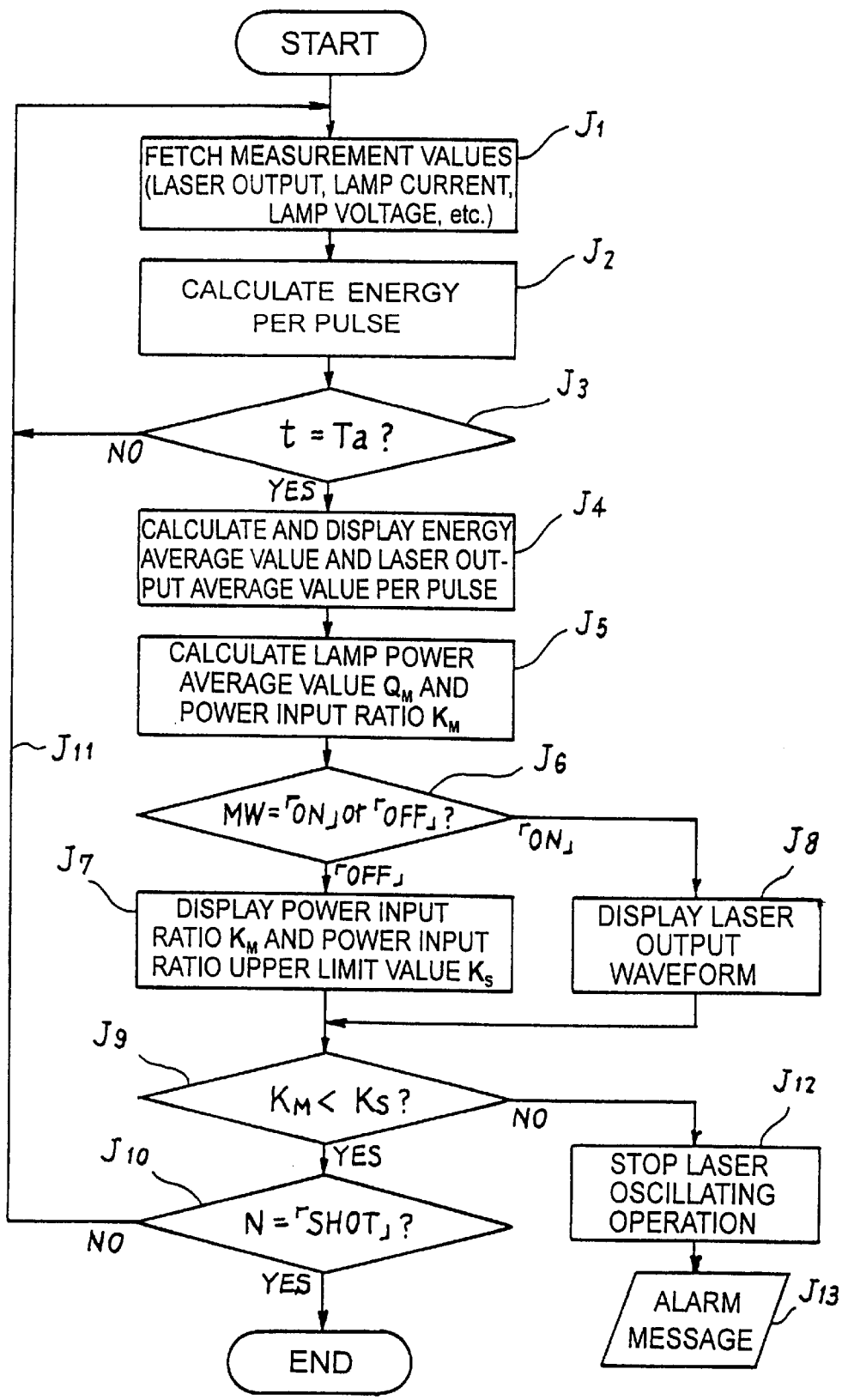
FIG. 11 is a diagram showing main processing procedures executed by the CPU in a power monitor mode of the embodiment.

Referring then to FIGS. 9 and 10, the contents of "power monitor screen" by way of example. FIG. 11 illustrates main processing procedures executed by the CPU 70 in the power monitor mode and FIG. 12 illustrates an "alarm message screen" in the power monitor mode.

On the "power monitor" screen there appear e.g., measured values of the energy (J) and the average power (W) of the most recently shot pulsed laser beam LB.

Typically, in response to a single pressing action of the start button 34, the pulsed laser beam LB is iteratively shot at a certain cycle "REPEAT" until the number "SHOT" previously set in the schedule mode is reached.

When the start button 34 is pressed in the schedule mode (step B7) or when a start signal is fed via the interface circuit 88 from an external apparatus (not shown), the CPU 70 starts the emission of the pulsed laser beams LB. Incidentally, the start signal from the external apparatus provides a designation of the schedule number as well as an instruction on the start of the laser emission.

In the CPU 70, the data management unit 96 first reads set values of various conditions or items associated with the currently selected schedule number and various set values of the status information from the predetermined storage location within the set value storage unit 100, to set them at predetermined registers, counters, etc., of each part.

Then, in accordance with the feedback control system designated by the "status screen", the input buffer unit 90, the control signal generation unit 92, the arithmetic unit 94, etc., generate a switching control signal SW for laser output waveform control at a predetermined high frequency, to provide a switching control of the transistor 64 by way of the drive circuit 66.

In parallel with such a waveform control, the "power monitor screen" appears on the display of the display unit 86, while the CPU 70 allows the arithmetic unit 94, the data management unit 96, the measurement value storage unit 98, etc., to execute monitoring in the procedures as shown in FIG. 11.

In this monitoring, for the duration when the laser oscillation unit 40 oscillatorily shoots the pulsed laser beams LB, the CPU 70 fetches a laser output measured value $S_L$ from the laser output measuring unit 74, a lamp voltage measured value $S_V$ from the voltage measuring circuit 76, and a lamp current measured value $S_I$ from the current measuring circuit 80 (step $J_1$), and finds an energy per pulse on the basis of time integral value of the laser output measured value $S_L$ (step $J_2$).

Then, every certain time $T_a$, e.g., 1 sec. (step $J_3$), an energy average value ENERGY and a laser output average value AVERAGE are obtained for the most recent time duration of $T_a$ by computing on the basis of the energy cumulative value for each pulse, the thus obtained monitor values being displayed on the "power monitor screen" in its left half (step $J_4$). Furthermore, a lamp power average value $Q_M$ and a power input ratio $K_M$ are obtained by computing on the basis of the lamp power (SV·SI) cumulative value for each pulse (step $J_5$).

Herein, the power input ratio $K_M$ is defined as $Q_M/Q_L$, a ratio of the lamp power average value $Q_M$ to a lamp input power limit value $Q_L$ previously set (registered) in the memory 72 for the excitation lamp 52. It is to be noted that the model number of the laser processing apparatus determines the kind of the excitation lamp 52, with its lamp input power limit value $Q_L$ specified.

On the "power monitor screen" of this embodiment there appears a waveform selection item MW on its topmost line to allow the user to judge which display mode is indicated ON or OFF (step $J_6$).

When OFF display mode is indicated, as shown in FIG. 10, the screen displays in its right half region the upper and lower limit monitor values HIGH and LOW of the energy average value, together with the item of the lamp power input ratio LAMP INPUT PWR, the above lamp power input ratio $K_M$ being indicated in percentage as the measured value of the LAMP INPUT PWR (step $J_7$).

This OFF mode further allows any upper limit value $K_S$ desired by the user for the lamp power input ratio $K_M$ to be set and indicated in REFERENCE SET item. The setting indication of the lamp power input ratio upper limit value $K_S$ can be carried out using the same procedures as in the steps $B_2$ to $B_6$ in the schedule mode. The lamp power input ratio upper limit value $K_S$ can typically be set to a value, e.g., 95% slightly lower than the maximum value (100%) corresponding to the lamp input power limit value $Q_L$.

In addition to the above indications, the relation of magnitude is judged between the lamp power input ratio $K_M$ and the upper limit value $K_S$ (step $J_9$).

For a brief period of time after the replacement with a new excitation lamp 52, it is common in the feedback function, especially in the laser output feedback function that the power fed to the excitation lamp 52 to obtain a desired laser output is kept at a value in the vicinity of the laser output set value and is fairly smaller than the lamp input power limit value $Q_L$. Hence, $K_M < K_S$ results.

When this result of judgment ($K_M < K_S$) is acquired, the lamp input power is judged to lie within a safety range, so that the above steps ($J_1$ to $J_9$) are iterated until the number of times N of shot of the pulsed laser beam LB reaches the set number SHOT (steps $J_{10}$, $J_{11}$).

However, increased number of times of laser oscillation after the replacement of the excitation lamp 52 may result in a gradually lowering laser oscillation efficiency due to deterioration of the lamp itself or due to dirt or the like on the YAG rod 54 or the resonator mirrors 56, 58. Then, under the laser output feedback function, the increase of such a deterioration with time in the laser oscillation unit 40 may result in a gradual increase of power to be input (fed) to the excitation lamp from the laser power supply unit in order to keep the laser output of the laser beam LB at the set value.

Thus, as the performance of the laser oscillation unit 110 deteriorates as time increases, the lamp power input ratio $K_M$ will gradually go up. Then, the lamp power input ratio $K_M$ eventually reaches or exceeds the upper limit value $K_S$, short of its maximum value (100%).

If this condition ($K_M \geq K_S$) is satisfied, then the CPU 70 ceases the laser oscillation at once (steps $J_9$, $J_{12}$). Thus, at this point of time the laser processing also comes to a stop.

Then, on the display of the display unit 86 the "power monitor screen" is switched over to the "alarm message screen" as shown in FIG. 12 (step $J_{13}$). This "alarm message screen" informs user of the cause of the stop, i.e., of the approach of the lamp input power to its limit value and urges the user to inspect or replace the excitation lamp 52.

When ON is set and entered into the waveform selection item MW on the "power monitor screen", a waveform diagram indicative of a laser output waveform (measured values) of the pulsed laser beam LB appears in its right half region, as shown in FIG. 9 (step $J_8$). This waveform diagram is acquired by executing desired data processing by the arithmetic unit 94 in the CPU 70 on the basis of laser output measured values $S_L$ from the laser output measuring unit 74, the waveform diagrams being stored in the measurement value storage unit 98.

In this ON display mode there appears neither the lamp power input ratio $K_M$ nor the upper limit value $K_S$. Judgement is however made of the relation of magnitude between the two ($K_M$, $K_S$) (step $J_9$). Accordingly, if $K_M \geq K_S$, then the laser oscillation is immediately ceased (step $J_{12}$) in the same manner as in the above OFF display mode, and the "alarm message screen" of FIG. 12 is displayed (step $J_{16}$).

In this embodiment, as set forth hereinabove, when the pulsed laser beam LB is oscillated and emitted, every certain interval $T_a$, the ratio (lamp power input ratio) $K_M$ of the present laser output average value $Q_M$ relative to the lamp input power limit value $Q_L$ is determined for the excitation lamp 52.

The user can visually verify (recognize) on the "power monitor screen," in the OFF display mode, the state of the gradually increasing lamp power input ratio $K_M$ corresponding to deterioration of the laser oscillation unit 40 over time. It is possible in the laser output feedback function in particular, to recognize the state of the remarkably increasing lamp power input ratio $K_M$.

The excitation lamp 52 could thus be replaced during the resting period for example, or at appropriate time before the lamp power input ratio K reaches the optionally set upper limit value $K_S$. This will prevent any breakage of the excitation lamp 52 and contribute to avoidance of any unexpected sudden stop of the laser oscillation and of the laser processing. It is to be appreciated that the replacement of the lamp may be combined with cleaning of the end faces of the YAG rod 54 or the optical resonator mirrors 56, 58.

Even though the gradually rising lamp power input ratio $K_M$ may be disregarded or overlooked with performance of the laser oscillation unit 40 deteriorating over time, the apparatus will automatically cease the laser oscillation and display an alarm message informing the user of the causes of the stop at the time when the lamp power input ratio $K_M$ has reached the upper limit value $K_S$, short of the maximum value (100%) corresponding to the lamp input power limit value $Q_L$. In this manner, it is possible to urge the user to replace the lamp before the excitation lamp 52 breaks.

Although, in the above embodiment, the lamp input power measured values for obtaining the lamp power input ratio $K_M$ were the lamp input power average values $Q_M$ for each certain period of time $T_a$, they could be lamp input power moving average values. Alternatively, lamp input power effective values, an average value for full laser oscillation period of time, etc., could be used.

In the above embodiment, the laser processing conditions are managed on a schedule-to schedule basis. When altering the schedule number set as entered into the schedule item SCH. # on the "schedule screen" or "power monitor screen", the laser processing conditions, especially the laser output set values, may vary. Further, the values of the lamp power input ratio $K_M$, LAMP INPUT PWR displayed on the "power monitor screen" may change.

More specifically, as the laser output set becomes higher, the electric power input to the excitation lamp 52 will also increase proportionally. Therefore, the lamp power input ratio $K_M$ will go up. Similarly, as the laser output set value becomes lower, the electric power fed to the excitation lamp 52 will also decrease proportionally. Therefore, the lamp power input ratio $K_M$ will go down.

In any event, under the same laser output set value, the lamp power input ratio $K_M$ will increase monotonously as the performance of the laser oscillation unit 40 deteriorates over time. The user can thus monitor the state of the increasing $K_M$ value, so that it is possible to perform the part replacement of, repair of, or cleaning operations to, the excitation lamp 52 or the laser oscillation unit 40 at an appropriate time, and at a time convenient for the resting periods of the laser processing.

Although in the above embodiment, the lamp power input ratio $K_M$ has been diligently displayed in percentage numerical values, an analog displays or diagrammatic displays would also be possible. The same applies to the lamp power input ratio upper limit value $K_S$. The contents of display of the "alarm message screen" of FIG. 12 are merely by way of example, and various modifications are feasible. Further, the message could also be replaced by the lighting of predetermined alarm lamps.

The contents of display of the "schedule screen" in the above embodiment are also a mere example, and various modifications could be made of not only the contents of display, but also the laser output waveform setting method.

A mouse, a tablet or the like could be used as the set value input means. The light source for excitation in the laser oscillation unit is not limited to the excitation lamp, but otherwise it could be a semiconductor laser for example.

The above-described multi-position processing system is a mere illustrative example, and the laser beams from the laser oscillation unit may directly be input to the optical fiber without splitting the same. Although the embodiment has been related to the pulsed laser processing apparatuses, the present invention would be applicable to continuous oscillation laser processing apparatuses, laser processing apparatuses without waveform control function, etc.

What is claimed is:

1. A laser processing apparatus comprising:
    a laser oscillation unit for emitting a laser beam by exciting a solid-state laser medium with optical energy emitted from a light source for excitation;
    a laser power supply unit for supplying electric power to said light source for excitation;
    input power measurement means for measuring electric power fed to said light source for excitation;
    input power limit value setting means for setting limit values of input power to said light source for excitation;
    power input ratio computing means which accepts input power measured values from said input power measurement means to determine a ratio of said input power measured value to said input power limit value; and
    power input ratio display means for providing a display output of the ratio determined by said power input ratio computing means.

2. A laser processing apparatus according to claim 1, further comprising:
    power input ratio upper limit setting means for setting a desired upper limit of the ratio; and
    alarm signal output means for issuing a predetermined alarm signal when the ratio determined by said power input ratio computing means reaches or exceeds said upper limit value.

3. A laser processing apparatus according to claim 2, further comprising alarm display means for providing a display output of predetermined alarm information in response to said alarm signal.

4. A laser processing apparatus according to claim 2, further comprising laser oscillation stop means for easing laser oscillation in response to said alarm signal.

5. A laser processing apparatus according to claim 1, further comprising:
    laser output setting means for setting a desired laser output of said laser beam;
    laser output measurement means for measuring laser output of said laser beam;
    laser output comparison means for comparing laser output measured values acquired by said laser output measurement means with laser output set values from said laser output setting means, in order to find a comparison error; and
    laser output control means for providing control of electric power, current, or voltage fed to said light source for excitation in response to said comparison error so as to ensure that said laser output measured value coincides with said laser output set value.

6. A laser processing apparatus according to claim 2, further comprising:
    laser output setting means for setting a desired laser output of said laser beam;
    laser output measurement means for measuring laser output of said laser beam;
    laser output comparison means for comparing laser output measured values acquired by said laser output measurement means with laser output set values from said laser output setting means, in order to find a comparison error; and
    laser output control means for providing a control of electric power, current or voltage fed to said light source for excitation in response to said comparison error so as to ensure that said laser output measured value coincides with said laser output set value.

7. A laser processing apparatus according to claim 3, further comprising:
    laser output setting means for setting a desired laser output of said laser beam;
    laser output measurement means for measuring laser output of said laser beam;
    laser output comparison means for comparing laser output measured values acquired by said laser output measurement means with laser output set values from said laser output setting means, in order to find a comparison error; and
    laser output control means for providing a control of electric power, current or voltage fed to said light source for excitation in response to said comparison error so as to ensure that said laser output measured value coincides with said laser output set value.

8. A laser processing apparatus according to claim 4, further comprising:
    laser output setting means for setting a desired laser output of said laser beam;

laser output measurement means for measuring laser output of said laser beam;

laser output comparison means for comparing laser output measured values acquired by said laser output measurement means with laser output set values from said laser output setting means, in order to find a comparison error; and laser output control means for providing a control of electric power, current, or voltage fed to said light source for excitation in response to said comparison error so as to ensure that said laser output measured value coincides with said laser output set value.

9. A laser processing apparatus comprising:

a laser oscillation unit for emitting a laser beam by exciting a laser medium with energy provided by an excitation source;

a laser power supply unit for supplying electric power to said excitation source;

input power measuring device for measuring electric power fed to said excitation source;

input power limit value setter that sets limit values of input power to said excitation source;

power input ratio computer which accepts input power measured values from said input power measuring device to determine a ratio of said input power measured value to said input power limit value; and power input ratio displayer that displays a display output of the ratio determined by said power input ratio computer.

10. A laser processing apparatus according to claim 9, wherein said laser medium is a solid state laser medium, and said excitation source is a light source; and wherein said light source excites said solid state laser medium with optical energy.

11. A laser processing apparatus according to claim 10, further comprising:

power input ratio upper limit setter that sets a desired upper limit of the ratio; and alarm signal generator that issues a predetermined alarm signal when the ratio determined by said power input ratio computer reaches or exceeds said upper limit.

12. A laser processing apparatus according to claim 11, further comprising an alarm display that displays output of predetermined alarm information in response to said alarm signal.

13. A laser processing apparatus according to claim 11, further comprising a laser oscillation stopper that stops laser oscillation in response to said alarm signal.

14. A laser processing apparatus according to claim 10, further comprising:

laser output setter that sets a desired laser output of said laser beam;

laser output measurer that measures laser output of said laser beam;

laser output comparitor that compares laser output measured values acquired by said laser output measurer with laser output set values from said laser output setter, in order to find a comparison error; and laser output controller that controls electric power, current, or voltage fed to said light source for excitation in response to said comparison error so as to ensure that said laser output measured value coincides with said laser output set value.

15. A laser processing apparatus according to claim 11, further comprising:

laser output setter that sets a desired laser output of said laser beam;

laser output that measures laser output of said laser beam;

laser output comparitor that compares laser output measured values acquired by said laser output measurer with laser output set values from said laser output setter, in order to find a comparison error; and laser output controller that controls electric power, current or voltage fed to said light source for excitation in response to said comparison error so as to ensure that said laser output measured value coincides with said laser output set value.

16. A laser processing apparatus according to claim 12, further comprising:

laser output setter that sets a desired laser output of said laser beam;

laser output measurer that measures laser output of said laser beam;

laser output comparitor that compares laser output measured values acquired by said laser output measurer with laser output set values from said laser output setter, in order to find a comparison error; and laser output controller that controls electric power, current or voltage fed to said light source for excitation in response to said comparison error so as to ensure that said laser output measured value coincides with said laser output set value.

17. A laser processing apparatus according to claim 13, further comprising:

laser output setter that sets a desired laser output of said laser beam;

laser output measurer that measures laser output of said laser beam;

laser output comparitor that compares laser output measured values acquired by said laser output measurer with laser output set values from said laser output setter, in order to find a comparison error; and laser output controller that controls electric power, current, or voltage fed to said light source for excitation in response to said comparison error so as to ensure that said laser output measured value coincides with said laser output set value.

* * * * *